Dec. 28, 1926.　　　　　　　　　　　　　　　　　1,612,263
G. B. COLLIER
INTERNAL COMBUSTION MOTOR
Filed Jan. 15, 1921　　　6 Sheets-Sheet 1
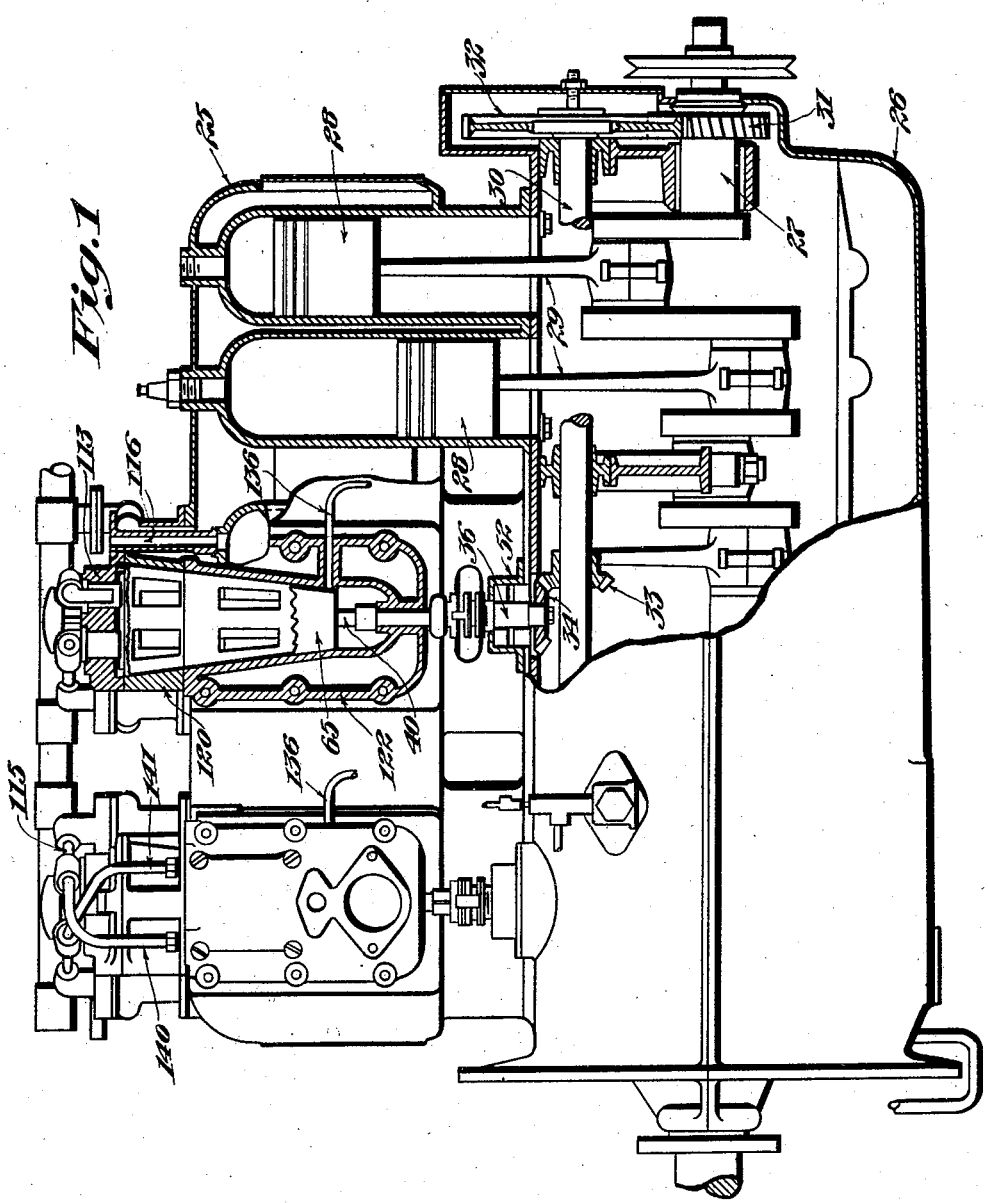

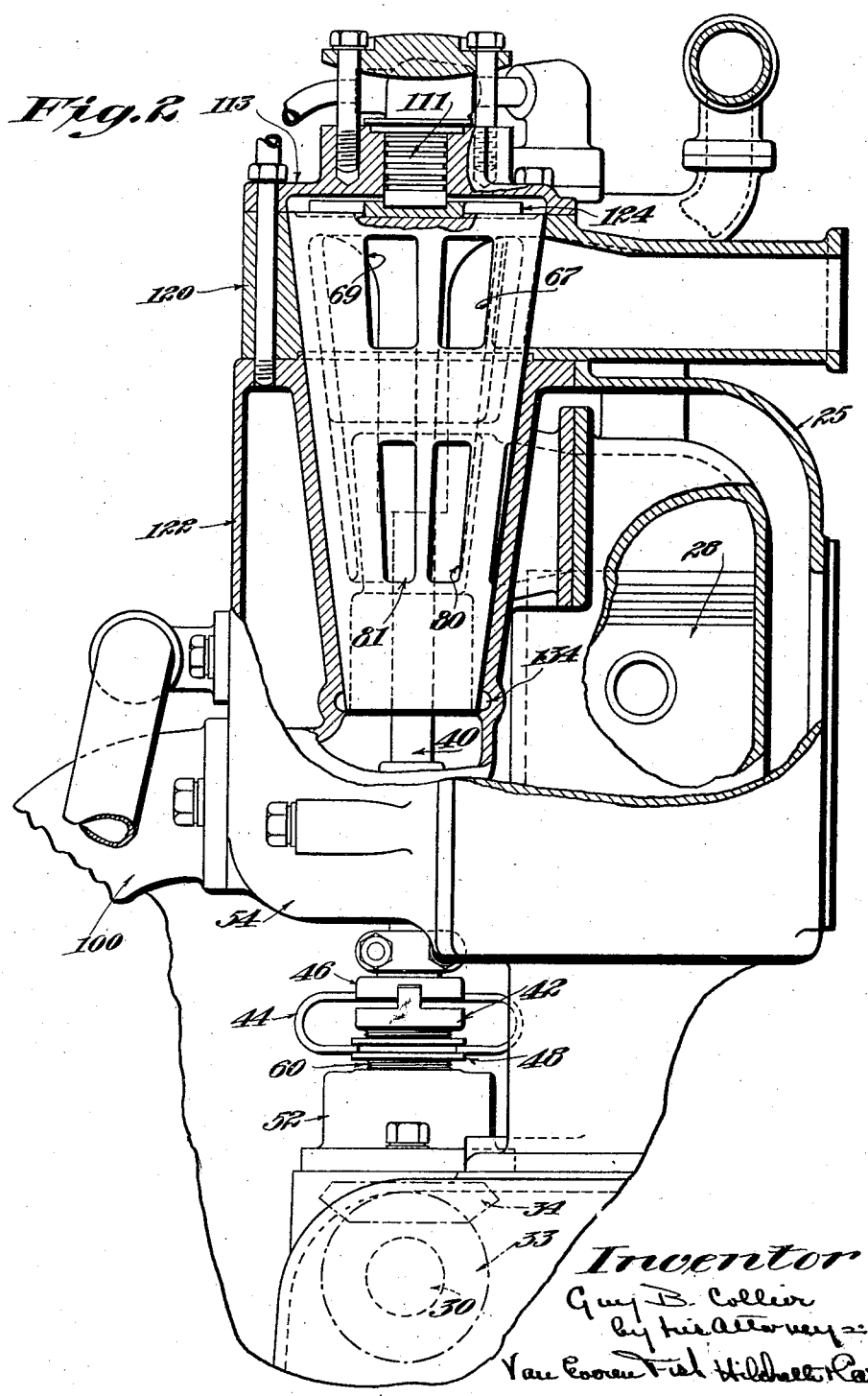

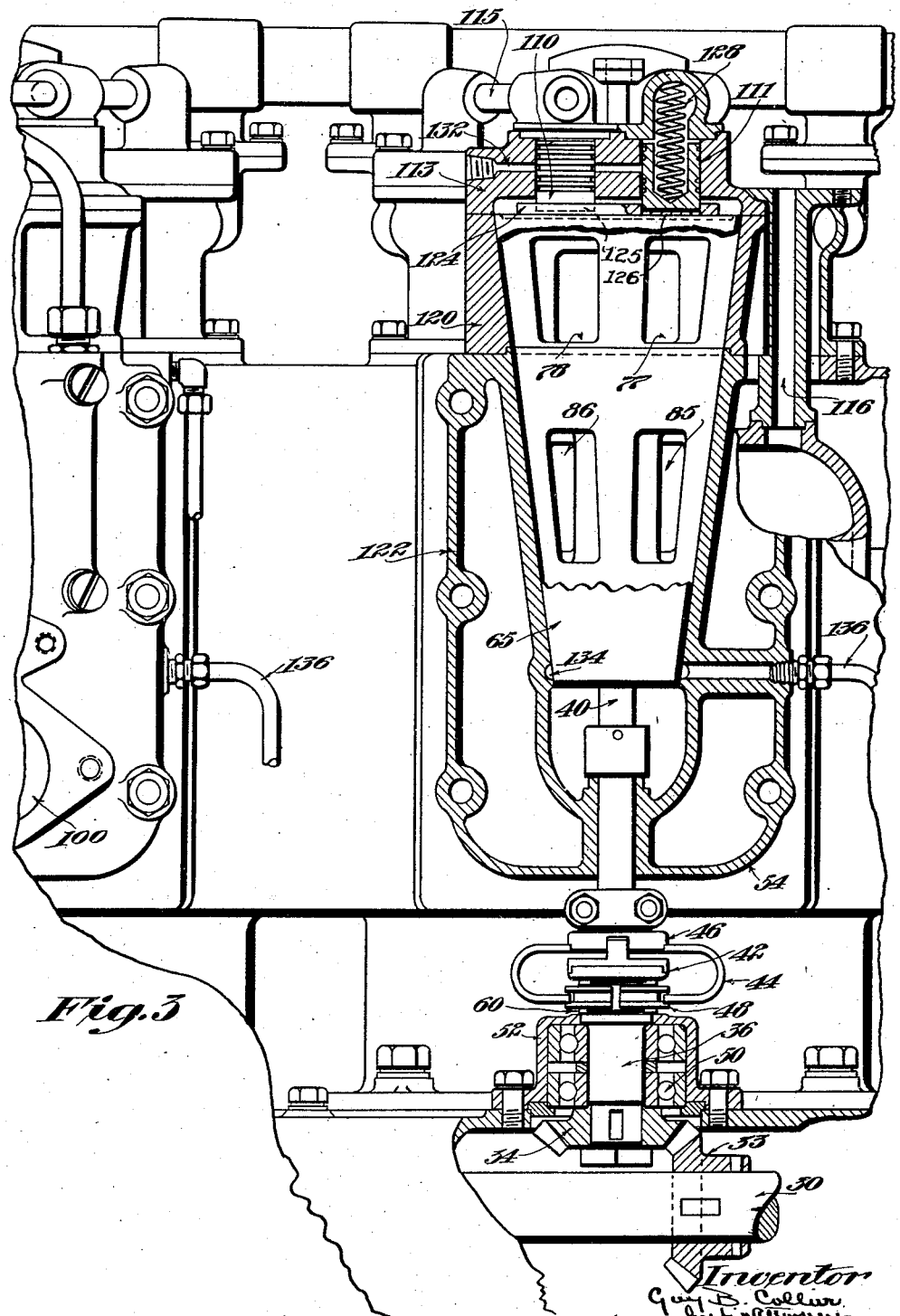

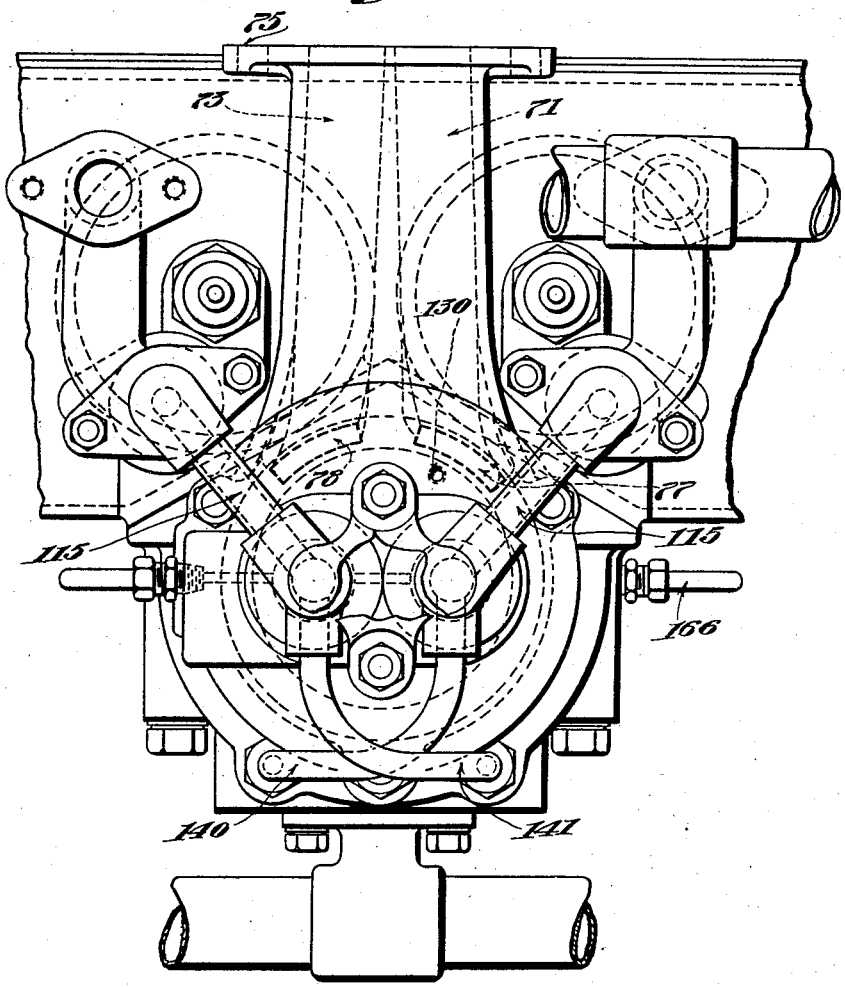

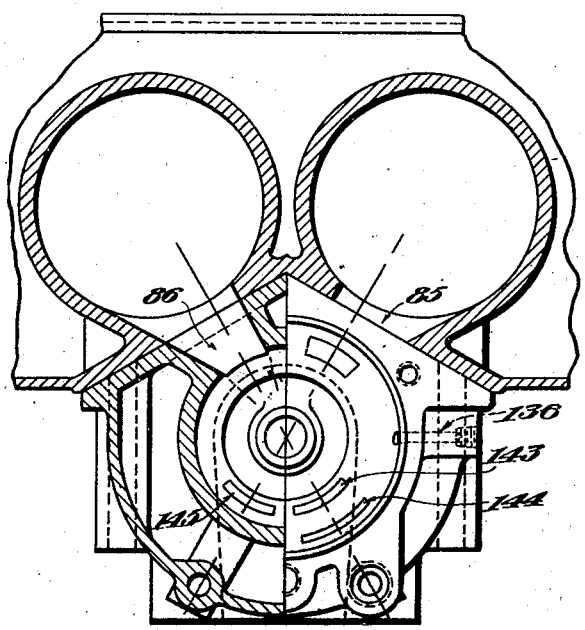
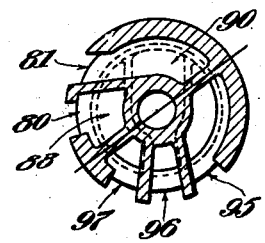
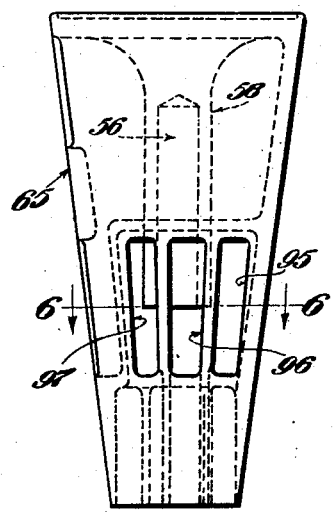
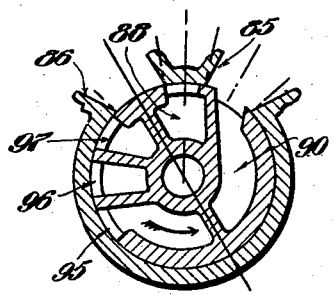
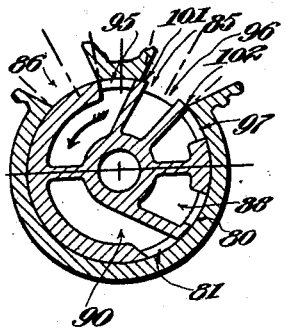

Dec. 28, 1926.
G. B. COLLIER
1,612,263
INTERNAL COMBUSTION MOTOR
Filed Jan. 15, 1921 6 Sheets-Sheet 6
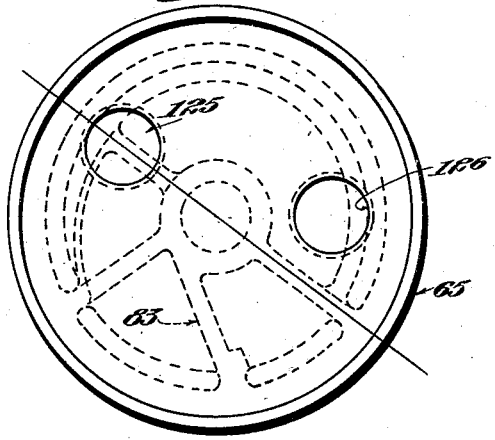
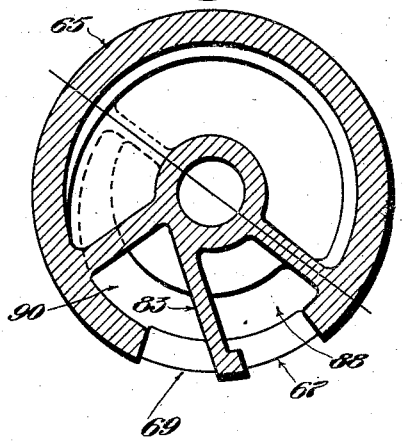
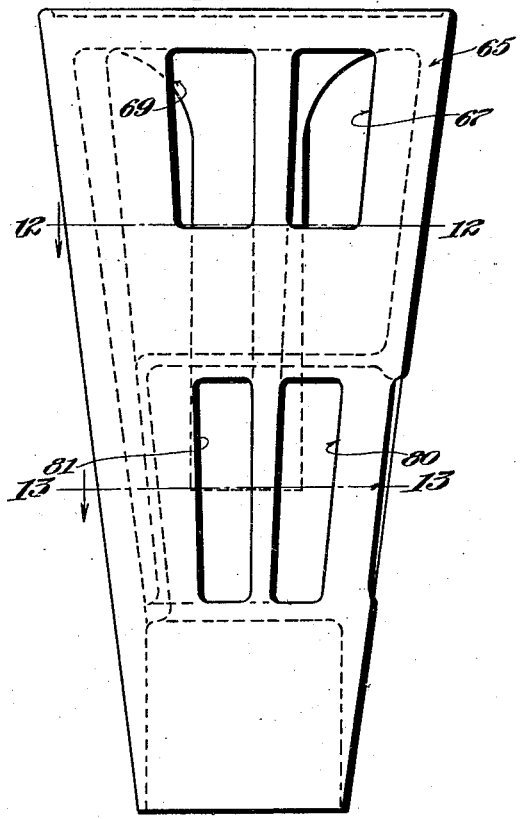
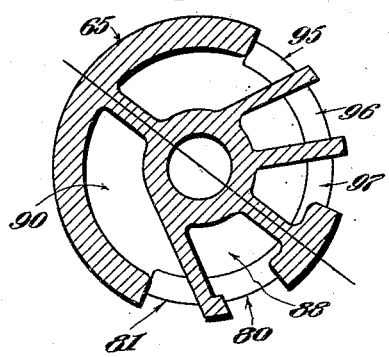
Inventor
Guy B. Collier
by his attorneys
Van Everen Fish Hildreth Patented Dec. 28, 1926.

1,612,263

UNITED STATES PATENT OFFICE.

GUY B. COLLIER, OF KINDERHOOK, NEW YORK.

INTERNAL-COMBUSTION MOTOR.

Application filed January 15, 1921. Serial No. 437,414.

The present invention relates to internal combustion motors and more particularly to motors of the type disclosed in the patent to Collier No. 1,040,277, dated October 8, 1912.

In this type of motor the flow of gas to and from the cylinders of the motor is controlled through the medium of rotary valve mechanism, each valve governing the flow of gas in connection with two adjacent cylinders.

The object of the present invention is to reorganize and improve internal combustion motors of the above described type embodying rotary valve mechanism in order to simplify the construction and improve the efficiency of operation.

With this object in view the various features of the invention consists in certain novel features of construction, combinations and arrangements of parts hereinafter described and claimed, the advantages of which will be obvious to those skilled in the art from the following description.

In the accompanying drawings illustrating the preferred form of the invention Fig. 1 represents a side elevation partly in section of a motor embodying the new features of the present invention; Fig. 2 is a detail illustrating an elevation partly in section of one of the rotary valves with certain of the parts cooperating therewith, Fig. 3 is an elevation partly in section illustrating a view of the valve housing and showing the inlet ports therein communicating with the intake manifold and the combustion chambers of the cylinders; Fig. 4 is a detail illustrating a top plan view of one of the rotary valves and the passages cooperating therewith; Fig. 5 is a section in plan of the rotary valve seat together with the cylinders communicating therewith; Fig. 6 is a section of a valve taken upon the line 6—6 of Fig. 7; Fig. 7 is an elevation of one of the valves removed from the housing; Fig. 8 is a cross section of the valve and a portion of the housing illustrating the relation of the valve channels to the ports in the housing in one position of the valve; Fig. 9 is a cross section similar to Fig. 8 illustrating the valve in another position within the housing; Fig. 10 is a top plan view of the valve without the pressure shoe in position; Fig. 11 is an elevation of the valve similar to Fig. 7 but illustrating the opposite side of the valve; Fig. 12 is a cross section of the valve shown in Fig. 11 taken on the line 12—12; and Fig. 13 is a cross section of the valve taken on the line 13—13 of Fig. 11.

The illustrated embodiment of the invention is shown in connection with a six cylinder internal combustion motor having three rotary valves which respectively control the intake and exhaust of gas to and from each of the three pairs of cylinders. With the firing order employed in this motor the adjacent cylinders of a pair controlled by each valve fire successively 120° apart. The valves are rotated continuously at one-half the speed of the crank shaft so that each valve must be designed to permit the intake of gas to the two cylinders controlled by it during an angular rotative movement of 60°. According to the present invention the intake to and exhaust of gases from all of the cylinders of the motor is accomplished in an efficient manner and during a continuous rotative movement of the valves at a constant speed. As indicated in Fig. 1 of the drawings, the internal combustion motor as a whole comprises a water jacketed cylinder casting 25 connected to a crank case 26 in which is journaled a six throw crank shaft 27 connected with pistons 28 through connecting rods 29. Supported within the crank case above and at one side of the crank shaft is a valve shaft indicated at 30 which is driven from the crank shaft at one-half the speed of the latter through intermeshing spur gears 31 and 32. The valve shaft drives each of the rotary valves through intermeshing beveled gears 33 and 34 secured respectively upon the main valve shaft 30 and vertical valve shafts 36. As illustrated and described in the patent heretofore referred to the rotary valves are of frusto conical form and are balanced in accordance with variations in pressure within the cylinder. In order to permit rising and falling movements of the valves, each vertical shaft 36 is connected with a shaft 40 through an "Oldham" coupling indicated at 42. The vertical connection between the two members is yieldingly maintained through a "Cardan" spring 44 secured at its upper end to a head 46 forming one member of the "Oldham" coupling and having its lower ends engaging in a peripheral groove formed in a head 48 secured to the upper end of the shaft 36. The shaft 36 as illustrated in Fig. 3 may be journaled in ball bearings indicated at 50 which are supported within a bearing housing 52 secured to the upper portion of the crank case. The shaft 40 is journaled loosely in the valve housing 54 and is received at its upper end in a socket 56 formed in a central web 58 of the rotary valve as shown in Fig. 7. The upper end of the shaft 40 is secured within the socket to cause the valve to turn therewith. In order to adjust the pressure with which the "Cardan" spring 44 either draws the valve against the seat or holds it away therefrom, the head 46 is firmly connected to the shaft 48 and 36, as indicated at 60 and upon turning the head relative to the shaft the tension of the spring may be varied accordingly.

As stated previously, each of the rotary valves is designed to provide for the intake and exhaust of gases to and from each two adjacent cylinders firing successively. Upon referring to Figs. 2 to 13 inclusive, it will be observed that each conical valve 65 is provided with two sets of upper and lower inlet ports and with three separate exhaust ports communicating with exhaust passages discharging through the bottom of the valve for a purpose to be presently described. The two upper inlet ports 67 and 69 are adapted to register respectively with inlet passages 71 and 73 formed in an intake housing 75. This intake housing is adapted to be secured to the usual intake manifold in such a manner that both of the passages 71 and 73 communicate with the passage in the manifold. During the continuous rotation of the valve in the direction of the arrows in Figs. 8 and 9, the ports 67 and 69 respectively register with the ends of the passages 71 and 73, the horizontal projections of which are indicated in dotted lines at 77 and 78 in Fig. 4. Each of the ports 67 and 69 communicates with corresponding lower ports 80 and 81, these ports being located at the upper and lower ends of channels in the valve which are completely separated from one another by a partition wall or web 83, as indicated in Figs. 12 and 13. The lower ports 80 and 81 communicate during the continuous rotation of the valve with cylinder ports 85 and 86 as indicated in Fig. 5. Upon referring to Figs. 8 and 9 it will be observed that the channel in the valve governed by the ports 67 and 80 is indicated at 88 and the channel governed by the ports 69 and 81 is indicated at 90. With this construction of valve the intake of gas to the two adjacent cylinders firing successively may be properly controlled without interfering even though the intake of gas to one of the cylinders may be initiated before the intake of gas to the previous cylinder has been completed. This will be obvious upon referring to Fig. 8 which illustrates the channel 88 in position to initiate the intake of gas through the port 86 while the intake of gas through the channel 90 and the port 85 is still taking place. With this construction it will be observed that the intake of gas proceeds according to the following cycle during the continuous rotative movement of the valve. The port 80 registering with the cylinder port 85 and the port 67 registering with the intake passage 71 by way of 77 serve to permit the intake of combustible mixture into the cylinder. This continues during the rotary movement of the valve until the ports 67 and 80 pass beyond and out of register with their respective communicating passages. In the meantime the ports 69 and 81 have advanced into register with the intake port 77 and cylinder port 85 respectively to continue the intake of gas into the cylinder. During the continued flow of gas into the first cylinder the leading ports 67 and 80 move into register respectively with the intake port 78 and the cylinder port 86 to initiate the flow of gas therein. Owing to the separation of the two passages 71 and 73 and the inlet channels 88 and 90 in the valve, there is no intercommunication between the cylinders. After the port 81 has moved out of register with the cylinder port 85 and subsequently to the movement of the port 80 out of communication with the cylinder port 86 the port 81 moves into communication therewith to cause a continuous intake of gas into the second cylinder. The exhaust of gas is controlled in a like manner by three exhaust ports indicated respectively at 95, 96 and 97 which control the communication with separate exhaust channels or passages discharging outwardly through the bottom of the valve which is connected with an exhaust manifold indicated at 100 in Fig. 2. The three channels controlled by the exhaust ports 95, 96 and 97 are completely separated by partition walls 101 and 102 which extend downwardly to the bottom of the valve, see Figs. 6, 7 and 9. As will be observed from an inspection of Figs. 7 and 11 the inlet channels occupy the upper portion of the valve and the exhaust channels the lower portion of the valve, the lower inlet ports and exhaust ports being located at substantially the same level and both communicating with the cylinder ports 85 and 86. During the continuous rotary movement of the valve, the several exhaust ports successively register with the cylinder ports 85 and 86 to control the exhaust of burnt gases therefrom. This form of construction serves to efficiently control the intake and exhaust of gases to and from adjacent cylinders firing successively during a continuous rotary movement of the valve at a constant speed.

As stated previously, this type of valve mechanism employs means for balancing the valve both axially and laterally in accordance with variations of pressure within the cylinder. This is accomplished generally by applying to the valve forces or pressures which are substantially equal or greater and opposite to the otherwise unbalanced pressures exerted upon the valve through the cylinder ports when the latter are closed by the blank wall of the valve. In the present form of the invention the axial balance of each valve is secured by two pressure members or plungers 110 and 111 which are mounted in a pressure cap 113 having pressure chambers each in constant communication with one of the cylinders which the valve controls.

As will be observed from the drawings, communication betwen each pressure chamber and the corresponding cylinder is secured through a pressure pipe 115 which is connected at its opposite ends to the pressure cap 113 and to a vertical passage 116 communicating with the combustion chamber of the cylinder. As will be observed from an inspection of Figs. 2 and 3, the pressure cap 113 is supported upon an upper valve housing 120 having the intake housing 75 formed integral therewith. This upper valve housing is supported directly upon the main valve housing 122 and the three housings 113, 120 and 122 combine to completely encase the valve. In order to insure the most efficient application of the axial balance, each of the pressure plungers 110 and 111 engages at its lower end with a flat disk or shoe 124 which in turn rests upon the upper face of the rotating valve. The pressure shoe is provided in its upper face with two circular recesses 125 and 126 which receive the pressure plungers. With this construction the contacting surfaces of the shoe and valve may be properly lubricated and the resultant pressure of the two plungers transmitted to the valve. In order to prevent vibrations of the plungers due to the operation of the motor, it has been found desirable to hold each of the pressure plungers in engagement with the shoe by means of a compression spring 128 which is received within the hollow plunger and the pressure chamber surmounting the plunger to constantly maintain the plunger in yielding engagement with the shoe. With this construction, the downward pressure due to gas in communication with the cylinders exerted on the plungers through the shoe 124 imposes an axial pressure upon the valve which is at all times opposite and equal to or greater than a constant times the axial component of the pressure exerted through the cylinder ports 85 and 86. It will be observed from an inspection of Fig. 3 that the pressure plungers 110 and 111 are so designed as to form a seal and prevent the passage of the gas into the region between the upper face of the frusto conical valves and the pressure cap 113. In view of some leakage which inevitably takes place into this chamber, however, it is desirable to provide means for relieving any resultant pressure which may be created and to this end the upper portion of the pressure cap 113 is provided with an opening 130 of restricted diameter which permits the escape of gas from the chamber, providing the pressure within the chamber is greater than atmospheric. The lubrication of the chamber and contacting surfaces between the pressure shoe and the valve is preferably secured through a lubricant duct 132 formed in the pressure cap and communicating with both pressure plungers. This lubricant flows down by the pressure plungers into the region above the valve to lubricate the shoe and thence works downwardly along the surface of the valve where it is collected by an annular groove 134 connected with a return pipe 136. Oil is also supplied along the side of the valve by pipes and passages represented by 166. The lateral pressure upon the valve is secured in each valve by pressure pipes 140 and 141, as shown in Fig. 1, which connect the pressure chambers in the cap 113 with appropriate chambers formed in the valve housing. As shown in Fig. 5, the lateral chambers for balancing pressure through the cylinder port 86 are indicated at 143 and 144 respectively and the lower chamber for balancing lateral pressure through the port 85 is indicated at 145.

With the present type of valve mechanism the flow of gas to and from the cylinders of the motor is effectively controlled and the valves at all times fit closely within the valve housing, the frusto conical shape of each valve permitting it to rise or fall in the housing in accordance with variations in size due to expansion or contraction. In actual practice it has been found generally desirable to adjust the "Cardan" spring connections in such a manner that the valve is permanently held against its seat by a slight excess axial pressure.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. An internal combustion motor comprising a rotary valve, a plurality of separate inlet passages in the valve terminating in upper and lower inlet ports in the wall of the valve, and exhaust passage in the valve terminating at its upper end in an exhaust port at the level of the lower inlet ports and at its lower end in an opening at the bottom of the valve.

2. An internal combustion motor comprising two adjacent cylinders, a valve chamber, a port connecting the valve chamber with each cylinder, an intake port leading into the valve chamber above the cylinder port, a rotary valve supported in the chamber, an intake passage formed in the upper portion of the valve and terminating in two ports located respectively at the level of the intake port and the level of the cylinder ports, and an exhaust passage formed in the lower portion of the valve and terminating in ports situated respectively at the level of the cylinder ports and at the lower end of the valve.

GUY B. COLLIER.